United States Patent [19]
Smolen, Jr. et al.

[11] Patent Number: 5,224,572
[45] Date of Patent: Jul. 6, 1993

[54] LIGHTWEIGHT BRAKE ROTOR WITH A THIN, HEAT RESISTANT CERAMIC COATING

[76] Inventors: George W. Smolen, Jr., 208 Knoxwood Ct., Anderson, S.C. 29621; Gerald Martino, Box 202 Penn Valley Rd., New Stanton, Pa. 15672

[21] Appl. No.: 737,444

[22] Filed: Jul. 29, 1991

[51] Int. Cl.[5] .............................................. F16D 65/10
[52] U.S. Cl. ....................... 188/218 XL; 188/264 AA; 188/264 G; 192/107 M; 428/335; 428/469; 428/472; 428/701
[58] Field of Search ................. 188/18 A, 58, 218 XL, 188/264 A, 264 AA, 264 G; 192/70.12, 113 A, 107 M, 70.14, 70.19, 107 R; 428/469, 472, 701, 335, 697, 699, 702

[56] References Cited

U.S. PATENT DOCUMENTS

| | | | |
|---|---|---|---|
| 2,255,023 | 9/1941 | Eksergian | 188/218 XL |
| 3,550,739 | 12/1970 | Wiltsey | 192/107 MX |
| 3,584,718 | 6/1971 | Schiefer et al. | 192/107 MX |
| 4,052,530 | 10/1977 | Fonzi | 428/472 X |
| 4,180,622 | 12/1979 | Burkhard et al. | 192/107 MX |
| 4,290,510 | 9/1981 | Warren | 188/218 XL |
| 4,411,960 | 10/1983 | Mizuhara | 428/472 X |
| 4,544,607 | 10/1985 | Kaneno et al. | 428/472 |
| 4,770,930 | 9/1988 | Wrenn, Jr. et al. | 428/469 X |
| 5,080,977 | 1/1992 | Zaplatynsky | 428/469 X |

FOREIGN PATENT DOCUMENTS

| | | | |
|---|---|---|---|
| 0149428 | 9/1983 | Japan | 188/218 XL |
| 0127529 | 6/1987 | Japan | 188/264 G |
| 0116326 | 5/1989 | Japan | 188/218 XL |
| 2172676 | 9/1986 | United Kingdom | 188/218 XL |
| 2228053 | 9/1990 | United Kingdom | 188/218 XL |

Primary Examiner—Robert J. Oberleitner
Assistant Examiner—Josie A. Ballato
Attorney, Agent, or Firm—Cort Flint; Henry S. Jaudon

[57] ABSTRACT

A low temperature light weight brake rotor including an aluminum rotor having an inner section integrally formed with an outer section and a braking surface formed about the outer face of each section. A ceramic coating is adhered to each braking surface. The coating is of a consistent thickness of between 0.015 inch to 0.020 inch. Also, a plurality of circumferentially spaced radially spaced cooling apertures are arranged between the sections and act to vent heat away from the disc. This arrangement brings about a situation where braking temperatures of up to 2000° F. are created on the ceramic coating while the temperature of the aluminum rotor is held below 260° F. The coating consists of at least one of aluminum oxide, aluminum titanium and magnesium zirconate.

16 Claims, 2 Drawing Sheets

LIGHTWEIGHT BRAKE ROTOR WITH A THIN, HEAT RESISTANT CERAMIC COATING

BACKGROUND OF THE INVENTION

This invention relates to a brake rotor which is light weight yet operates at a low temperature. Such a brake rotor is particularly suitable for use on race cars.

In the past brake rotors formed of aluminum have been produced. Aluminum rotors have the problem that they begin to break down when heated to over 300° F. They begin disintegrating when temperatures over 500° F. are reached and they melt at 1100° F.

Coatings have been applied to rotors to help in dissipating the heat and to decrease wear. For example, U.S. Pat. No. 4,808,275 uses a nickel base coating having ceramic particles. This patent is not concerned with aluminum rotors but with improvements in wear, resistance, and corrosion resistance. U.S. Pat. No. 2,948,955 uses a coating including ceramic material. The patent indicates that more than 50% ceramic material results in inoperativeness. The patent is not concerned with aluminum rotors. U.S. Pat. No. 4,280,935 teaches use of friction material consisting essentially of a high carbon iron powder up to 60%. There is no concern for aluminum rotors.

U.S. Pat. No. 4,290,510 is concerned with a ceramic-metallic coating of 50% chrome carbide and 50% binder metal alloy which is applied at 0.4 mm. The coating did not prevent excessive heat build up in the rotor (450° C.). There is no teaching of using cooling vents.

U.S. Pat. No. 4,105,473 discloses coating an aluminum braking surface to achieve wear resistance.

U.S. Pat. Nos. 4,913,266 and 3,120,882 are directed to rotors having cooling vents. They are not concerned with maintaining aluminum rotors at below their break down temperature.

It is an object of this invention to provide a light weight brake rotor.

Another object of the invention is to provide a brake rotor which weighs no more than five pounds.

Another object of the invention is to provide an aluminum brake rotor which will operate at braking temperatures up to 2000° F.

Another object of the invention is to provide a braking surface which insulates the rotor body from heat created during braking.

Another object of the invention is to provide an aluminum rotor with cooling vents which act to cool down the rotor during and between braking operations.

SUMMARY OF THE INVENTION

The above objections are accomplished according to the present invention by providing a low temperature brake rotor comprising an aluminum brake rotor including a brake ring consisting of an inner and outer section, each having a braking surface. The braking surfaces are separated by a plurality of radially spaced cooling apertures which extend from an inner periphery of the ring to the outer periphery of the ring. A ceramic coating of no more than 0.020 inch covers the braking surfaces whereby temperatures created during braking are maintained at below 260° F. for the aluminum of the rotor. The rotor weighs between three and four pounds. The apertures are circular or oval shaped in cross-section and are approximately ¼ inch in diameter. The ceramic coating may consist of aluminum titanium and aluminum oxide. Lugs, which are circumferentially spaced radially extending, are formed along the inner periphery of one of the rotor sections.

An aluminum rotor which includes a unitary disc member having opposed annular brake shoe engaging faces is separated by an interior wall area. The wall area has a plurality of circumferentially spaced radially extending apertures located between the inner and outer surfaces of the rotor. The outer surface is formed with a central groove in which the apertures terminate. The wall integrity between the opposed faces is maintained at between ¾ inch and 1½ inches. The apertures act as cooling vents which expel heat outwardly from the rotor while the groove assists in expelling the heat. The entire arrangement weighs between three and four pounds. A ceramic coating of aluminum oxide, aluminum oxide and magnesium zirconate is adhered to each of the opposed faces of the rotor. The coating is of a consistent thickness of no more than 0.020 inch.

The coating acts as a heat reflector so that during braking a heat build up of up to 2000° F. may be achieved between a brake shoe and the coating while the aluminum of the rotor is maintained at a temperature of under 260° F.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

In automobile racing, especially NASCAR racing, the weight of the automobile can be critical. With all factors equal, the car which weighs the least will out perform the heavier cars. This applies to both speed and gasoline mileage.

The standard brake rotor weighs approximately fifteen pounds. This is a total weight for the four brake rotors of approximately sixty pounds. By providing a light weight rotor which weighs between three and four pounds, the unsprung weight and the rotating weight of the automobile may be reduced by as much as forty-eight pounds.

As is well known, the un-sprung weight is that weight which is not supported by the springs but which must be controlled by the suspension system. By substantially reducing this weight in the wheels, it becomes much easier to control them when they react to variations in the road surface.

The rotating weight is that weight which rotates. By reducing this weight acceleration is enhanced due to the law of inertia.

In order to reduce the weight of the rotor, an obvious alternative would be to look to light weight metals such as aluminum. Generally, these metals have not been satisfactory in the past because of the intense heat build up created during braking, especially braking at high speeds. Aluminum begins to break down at temperatures over 300° F., it begins to disintegrate at temperatures over 500° F. and at temperatures over 1100° F., it melts. Conversely, braking at high speeds can generate heat up to 2000° F. between the rotor face and the brake shoe.

In order to be able to use a light weight metal to form the brake rotor, some method must be developed to reflect a majority of the heat built up by the brake pad away from the aluminum. Also, it will be necessary to remove any heat which does build up in the aluminum between braking actions. These functions have been suitably solved by applying a ceramic coating to the braking area of the rotor. This coating acts to reflect the heat away from the rotor and also to insulate the metal. Also, venting holes or apertures arranged between the braking surfaces will act to carry heat built up in the metal outward and away from the rotor. This allows the rotor to completely cool down between braking actions so that the heat build up in the metal never exceeds 260° F.

Figure 1:
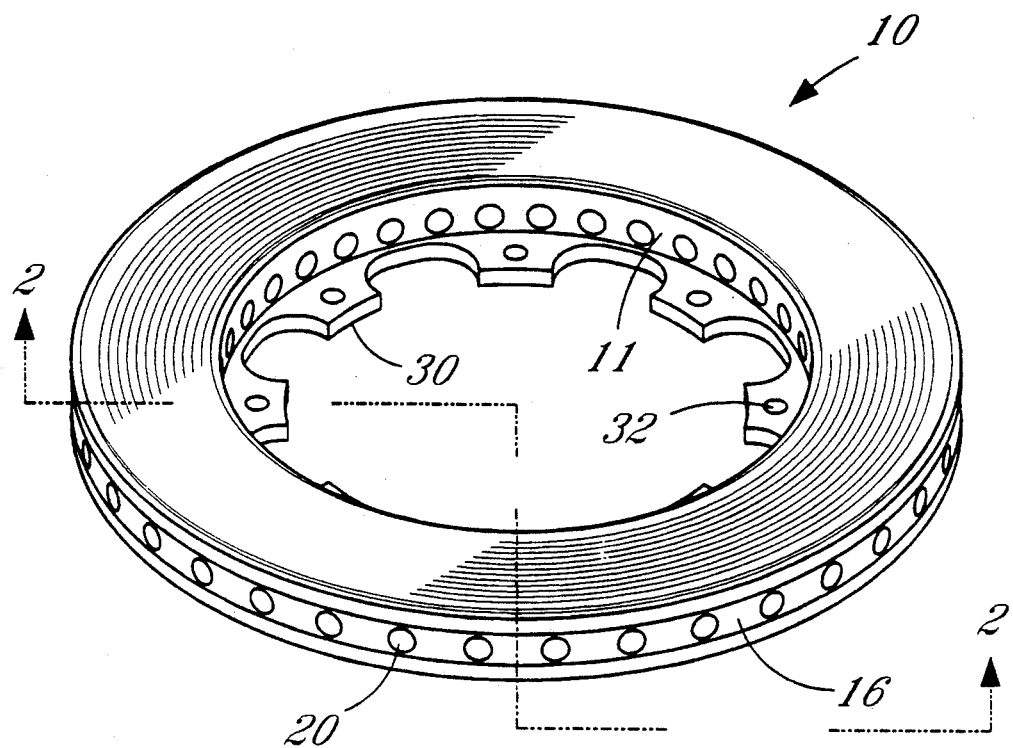
FIG. 1 is a perspective view of the braking disc of the invention.
Figure 2:
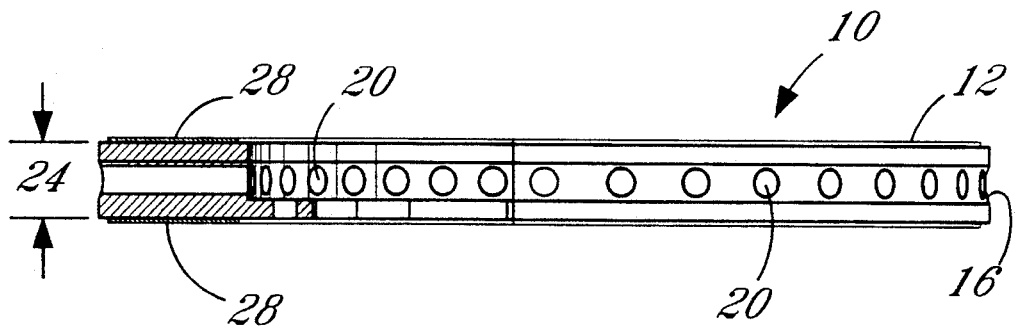
FIG. 2 is a part side and part side sectional view taken along lines 2—2 of FIG. 1.
Figure 3:
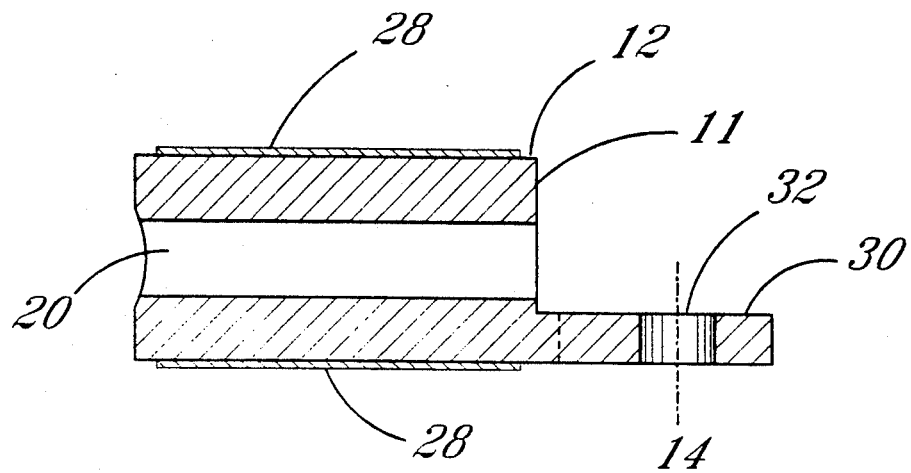
FIG. 3 is a sectional view showing the wall integrity adjacent an aperture and the coated braking faces.

A preferred arrangement of the invention can be seen in FIG. 1 which shows brake rotor 10. The rotor consists of cast aluminum or billet aluminum and weighs between three and four pounds. The weight will vary slightly depending on the thickness of the rotor. Rotor 10 shown in FIGS. 1 and 2 has a thickness of $\frac{3}{8}$ inch as illustrated at 24. The thickness may vary between $\frac{3}{8}$ inch and $1\frac{1}{2}$ inches. The diameter is between 9 and 14 inches.

Figure 4:
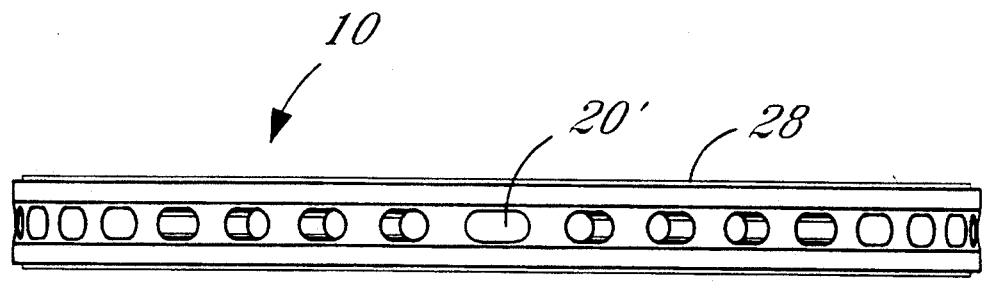
FIG. 4 is a side view of an alternative embodiment in which the apertures are oval shaped.

Rotor 10 includes braking disc or ring 11 which has opposed braking surfaces or faces 12 and 14. Between the braking faces 12 and 14 and formed about the outer periphery of the braking disc 11 is a groove 16 which is approximately $\frac{1}{8}$ inch deep. Extending from groove 16 through the braking disc 11 and terminating about the inner periphery thereof are a plurality of evenly and longitudinally spaced radially extending apertures or venting holes 20. The apertures may be circular as shown at 20 in FIGS. 1 or 2 or oval shaped as shown at 28 in FIG. 4. The apertures are approximately $\frac{1}{8}$ inch in diameter although this size may vary. It is necessary, however, that the wall integrity of braking disc 11 between apertures 20 and braking faces 12 and 14 be maintained at a thickness of at least $\frac{1}{8}$ inch. This wall integrity may be as much as $\frac{1}{4}$ inch.

Lugs 30 are arranged about the inner peripheral face of braking disc 11 and extend radially inwardly. Lugs 30 are provided with holes 32 for connection with a hub member.

Outer faces 12 and 14 have a ceramic coating 28 adhered thereto. The thickness of coating 28 does not exceed 0.020 inch. It has been found that a coating which exceeds that thickness becomes brittle and has a tendency to crack and flake off when in use. In order that the coating have sufficient wear resistance, it is necessary that the ceramic coating be at least 0.015 inch thick.

Prior to applying the ceramic coating surfaces 12 and 14 are treated or coated with a binder or bond coating. The bond coating acts to enhance the adherence of the ceramic coating to the rotor by relieving stress created due to expansion and contraction of the aluminum. The bond coating preferably possesses expansion and contraction properties intermediate those of aluminum and the ceramic coating. Suitable bond coatings are preferably selected from the group consisting of molybdenum, nickel chromium and nickel alumide although other binding materials could be used. The bond coating is applied by any known method. Plasma spraying, where powdered material is fed into a stream of plasma gas and then thrown against surfaces 11, 12 is preferred. This process provides an even coating which is easily applied. Also, it is preferred that the ceramic coating be applied to surfaces 11, 12 of the rotor by the same process.

It has been found that the most desirable ceramic coating is formed of magnesium zirconate, alumina oxide titanium oxide or stabilized zirconium. In some instances, it has been found that a combination of ceramic materials such as titanium oxide and aluminum oxide in a 60 to 40 ratio is desirable. The ceramic material is heated to as much as 2000° F. and applied to rotor faces 12 and 14 by a plasma spray process.

It is well known that ceramic coatings act as heat reflectors which protect metals at extremely high temperatures. The coating 28 will be heated to temperatures of between 1500° F. and 2000° F. regularly when braking action is occurring. Because of the reflective and insulating qualities of the ceramic coating, substantially all of this heat is diverted away from the aluminum rotor. Heat build up in the aluminum rotor is maintained at between 160° F. and 260° F. The cooling vents 20 create an outward draft when the rotor is in use. This draft draws heat generated in the area of the hub and within rotor 10 and expels it outwardly through vents 20 into groove 16 from which it is expelled away from the rotor. This venting action, along with the natural heat conductive characteristics of aluminum, allows the aluminum of rotor 10 to cool completely between braking operations.

Rotor 10 is designed for use with standard brake pads. It has been found that these pads create a co-efficient of friction with the ceramic coating which is at least equivalent that created with steel rotors.

While a preferred embodiment of the invention has been described using specific terms, such description is for illustrative purposes only, and it is to be understood that changes and variations may be made without departing from the spirit or scope of the following claims.

We claim:

1. A low temperature brake rotor comprising:

an aluminum brake rotor including a brake ring, said brake ring consisting of an inner and outer section, each having a braking surface, said braking surfaces being separated by a plurality of radially spaced cooling apertures which extend from an inner periphery of said ring to an outer periphery of said ring, said apertures act to vent heat outwardly when said rotor is in motion;

a circumferential groove disposed about said outer periphery and centrally of said inner and outer sections, said apertures opening into said groove which acts to assist in the venting action of said cooling apertures;

lugs, extending inwardly from said inner periphery of said ring, provide connection with a hub; and a heat reflecting ceramic coating of a thickness of between 0.015 inch to 0.020 inch covering said braking surfaces; whereby, the temperature of said aluminum rotor is maintained below 260° F. during braking.

2. The brake rotor of claim 1 wherein said rotor weighs between three and four pounds.

3. The brake rotor of claim 1 wherein said apertures are circular in cross-section and said apertures are approximately ½ inch in diameter.

4. The brake rotor of claim 1 wherein said ceramic coating consists of titanium oxide and aluminum oxide.

5. The brake rotor of claim 1 wherein said lugs are circumferentially spaced radially and extend from the inner periphery of one of the inner said brake sections.

6. A low temperature light weight brake rotor comprising:
- a braking disc having an inner section integrally formed with an outer section, a braking surface formed about outer faces of each said section;
- a heat reflecting ceramic coating adhered to each of said braking surfaces which acts to insulate and reflect heat away from said braking surfaces, said coating being of a consistent thickness of between 0.015 inch to 0.020 inch; and
- a plurality of circumferentially spaced and radially extending cooling apertures arranged between said sections, said apertures act to vent heat away from said disc, whereby;
- during braking a temperature of up to 2000° F. is created between said ceramic coating and a braking pad while the temperature of said rotor is maintained below 260° F.

7. The rotor of claim 6 wherein said coating consists of at least one aluminum oxide, titanium oxide and magnesium zirconate.

8. The rotor of claim 6 wherein said rotor weighs between three and four pounds.

9. The rotor of claim 6 wherein said apertures are oval shaped.

10. An aluminum rotor which weighs between three and four pounds comprising:
- a unitary disc member having opposed annular brake shoe engaging faces separated by an interior wall area;
- a plurality of circumferentially spaced radially extending apertures located between an inner surface and a cylindrical outer surface of said rotor, said apertures being of a size so that wall integrity between said opposed faces and each said aperture is between ⅛ inch and ¼ inch;
- said apertures act as cooling vents which expel heat outwardly from said rotor when in motion;
- a heat reflecting ceramic coating adhered to each of said opposed faces, said ceramic coating being evenly distributed at a thickness of no less than 0.015 inch and no more than 0.020 inch, said coating reflecting heat generated during braking away from said rotor; whereby, when said rotor is in the act of braking, heat of up to 2000° F. generated on said ceramic coating is reflected to a sufficient degree so that the temperature of said aluminum rotor is maintained below 260° F.

11. The rotor of claim 10 wherein said apertures are circular.

12. The rotor of claim 10 wherein said apertures have a diameter of approximately ½ inch.

13. The rotor of claim 10 wherein lugs are circumferentially spaced about one edge of an inner face of said rotor.

14. The rotor of claim 10 wherein a circumferential groove is formed about said outer surface between said opposed faces, said groove acts to assist said venting apertures carry heat away from said aluminum rotor.

15. The rotor of claim 10 wherein said ceramic coating consist of at least one of aluminum oxide, titanium oxide, magnesium zirconate and stabilized zirconium.

16. The rotor of claim 10 wherein said coating is approximately 0.015 inch thick.

* * * * *